(12) United States Patent
Bacher et al.

(10) Patent No.: US 10,547,595 B2
(45) Date of Patent: *Jan. 28, 2020

(54) RESTRICTING GUEST INSTANCES IN A SHARED ENVIRONMENT

(71) Applicant: International Business Machines Corporation, Armonk, NY (US)

(72) Inventors: Utz Bacher, Dettenhausen (DE); Reinhard T. Buendgen, Tuebingen (DE); Heiko Carstens, Boeblingen (DE); Dominik Dingel, Hamburg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/173,903

(22) Filed: Oct. 29, 2018

(65) Prior Publication Data
US 2019/0104115 A1   Apr. 4, 2019

Related U.S. Application Data

(63) Continuation of application No. 15/211,277, filed on Jul. 15, 2016, now Pat. No. 10,237,245.

(51) Int. Cl.
*H04L 29/06*   (2006.01)
*G06F 9/455*   (2018.01)

(52) U.S. Cl.
CPC ...... *H04L 63/0428* (2013.01); *G06F 9/45545* (2013.01); *G06F 9/45558* (2013.01); *G06F 2009/45587* (2013.01)

(58) Field of Classification Search
CPC .................................................. H04L 63/0428
(Continued)

(56) References Cited

U.S. PATENT DOCUMENTS 8,627,112 B2   1/2014   Chaturvedi et al.
8,775,590 B2   7/2014   Devarakonda et al.
(Continued)

FOREIGN PATENT DOCUMENTS

WO   WO2011156261   12/2011

OTHER PUBLICATIONS

Peter Mell et al., "The NIST Definition of Cloud Computing", National Institute of Standards and Technology, U.S. Department of Commerce, NIST Special Publication 800-145, Sep. 2011, 7 pages.
(Continued)

*Primary Examiner* — Longbit Chai
(74) *Attorney, Agent, or Firm* — Heslin Rothenberg Farley & Mesiti P.C.; William A. Kinnaman, Esq.

(57) ABSTRACT

A method includes a trusted component of a host computing system, obtaining, from a client, via a hypervisor of the host, a request to run an instance of a guest image within the hypervisor. The request includes a unique identifier of the guest image, contents of the guest image, and a communication key. The request is encrypted with a request key accessible to the owner and the trusted component and not accessible to the hypervisor. The trusted component generates an authorization request to an authorizing entity of the client requesting authorization for the hypervisor to run the instance. The authorization request includes the unique identifier, a use counter, and a unique challenge. The trusted component encrypts the authorization request with the communication key and communicates the authorization request to the authorizing entity, via the hypervisor.

20 Claims, 8 Drawing Sheets

(58) Field of Classification Search
USPC .......................................................... 713/168
See application file for complete search history.

(56) References Cited

U.S. PATENT DOCUMENTS

| | | |
|---|---|---|
| 8,782,351 B2 | 7/2014 | Arges et al. |
| 8,924,970 B2 | 12/2014 | Newell |
| 9,317,452 B1 | 4/2016 | Forschmiedt et al. |
| 9,354,911 B2 | 5/2016 | Levon |
| 2012/0054486 A1 | 3/2012 | Lakkavalli et al. |
| 2012/0179904 A1 | 7/2012 | Dunn et al. |
| 2016/0188465 A1 | 6/2016 | Almasi et al. |
| 2016/0205110 A1 | 7/2016 | Roth et al. |
| 2017/0124564 A1* | 5/2017 | Pi Farias .............. G06Q 20/203 |

OTHER PUBLICATIONS

List of IBM Patents or Patent Applications Treated as Related, Oct. 29, 2018, 2 pages.

* cited by examiner

500

510
One or more programs (of a trusted component) obtain from a client, via a hypervisor of the host, a request to run an instance of a guest image within the hypervisor

520
One or more programs generate an authorization request to an authorizing entity of the client requesting authorization for the hypervisor to run the instance.

530
One or more programs encrypt the authorization request with the communication key.

540
One or more programs communicate the authorization request to the authorizing entity, via the hypervisor.

550
One or more programs obtain, from the authorizing entity, via the hypervisor, the authorization.

560 Authorization authentic?

YES → 570a One or more programs initiate the instance.

NO → 570b One or more programs do not initiate the instance.

FIG. 5

Client 70

Deploys a guest image and instructs a hypervisor to initial-program load (IPL) the guest image

710

Hypervisor 72

Sets up guest context and requests that a trusted component start the guest.
720

Forwards request to authorizing entity.
740

Forwards request to trusted component.
755

Trusted Component 74

Detects that the image needs remote authorization before further execution and generates a request, including unique identifier and challenge, to the authorizing entity.
730

Starts guest.
760

Authorizing Entity 76

Compares the use counter associated with the unique identifier (e.g., image-uuid) against an intended maximum number of running instances for image-uuid and based on this comparison, responds to the challenge authorizing the start of the guest
750

FIG. 7

RESTRICTING GUEST INSTANCES IN A SHARED ENVIRONMENT

TECHNICAL FIELD

One or more aspects of the present invention relate to secure execution of programs in computing environments, including shared computing environments.

BACKGROUND

Shared and/or distributed computing environments, including but not limited to cloud computing systems enable the execution of various programs, including servers and virtual machines, sometimes referred to as guests. Guest programs like virtual machines include both applications and data and many shared computing environments rely on a layer, such as a hypervisor, to initiate the guest programs. However, in many environments, by relying on the hypervisor to manage the virtual machines, the hypervisor gains access to both the applications and the data that comprise these machines.

Another issue in computing environments is that a malicious hypervisor operator may clone guest instances, such as virtual servers, at will, examining them, and utilizing the data gleaned from these operations to run cryptographic attacks on the computing environment.

SUMMARY

Shortcomings of the prior art are overcome and additional advantages are provided through the provision of a method of authorizing an instance of guest image in a computing environment. The method includes, for instance: obtaining, by a trusted component of a host computing system, wherein the host comprises one or more processors, from a client, via a hypervisor of the host, a request to run an instance of a guest image within the hypervisor, wherein the request comprises a unique identifier of the guest image, contents of the guest image, and a communication key, and wherein the request is encrypted with a request key accessible to the owner and the trusted component and not accessible to the hypervisor; generating, by the trusted component, an authorization request to an authorizing entity of the client requesting authorization for the hypervisor to run the instance, wherein the authorization request comprises the unique identifier, a use counter, and a unique challenge, and wherein the generating comprises: decrypting, by the trusted component, the request with the request key to obtain the unique identifier, the contents of the guest image, and the communication key; determining, by the trusted component, based on the unique identifier, a number of instances of the guest image running in the host computing stored in the use counter; and generating, by the trusted component, the unique challenge; encrypting, by the trusted component, the authorization request with the communication key; and communicating, by the trusted component, the authorization request to the authorizing entity, via the hypervisor.

Shortcomings of the prior art are overcome and additional advantages are provided through the provision of a computer program product for authorizing an instance of a guest image in a computing environment. The computer program product includes, for instance a computer readable storage medium readable by one or more processors and storing instructions for execution by the one or more processors for performing a method that includes: obtaining, by a trusted component of a host computing system, wherein the host comprises one or more processors, from a client, via a hypervisor of the host, a request to run an instance of a guest image within the hypervisor, wherein the request comprises a unique identifier of the guest image, contents of the guest image, and a communication key, and wherein the request is encrypted with a request key accessible to the owner and the trusted component and not accessible to the hypervisor; generating, by the trusted component, an authorization request to an authorizing entity of the client requesting authorization for the hypervisor to run the instance, wherein the authorization request comprises the unique identifier, a use counter, and a unique challenge, and wherein the generating comprises: decrypting, by the trusted component, the request with the request key to obtain the unique identifier, the contents of the guest image, and the communication key; determining, by the trusted component, based on the unique identifier, a number of instances of the guest image running in the host computing stored in the use counter; and generating, by the trusted component, the unique challenge; encrypting, by the trusted component, the authorization request with the communication key; and communicating, by the trusted component, the authorization request to the authorizing entity, via the hypervisor.

Computer systems and methods relating to one or more aspects of the technique are also described and may be claimed herein. Further, services relating to one or more aspects of the technique are also described and may be claimed herein.

Additional features and are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

FIG. 5 depicts a workflow that illustrates aspects of an embodiment of the present invention;

FIG. 7 is a combination workflow and computing environment diagram illustrating aspects of certain embodiments of the present invention.

DETAILED DESCRIPTION

Figure 1:
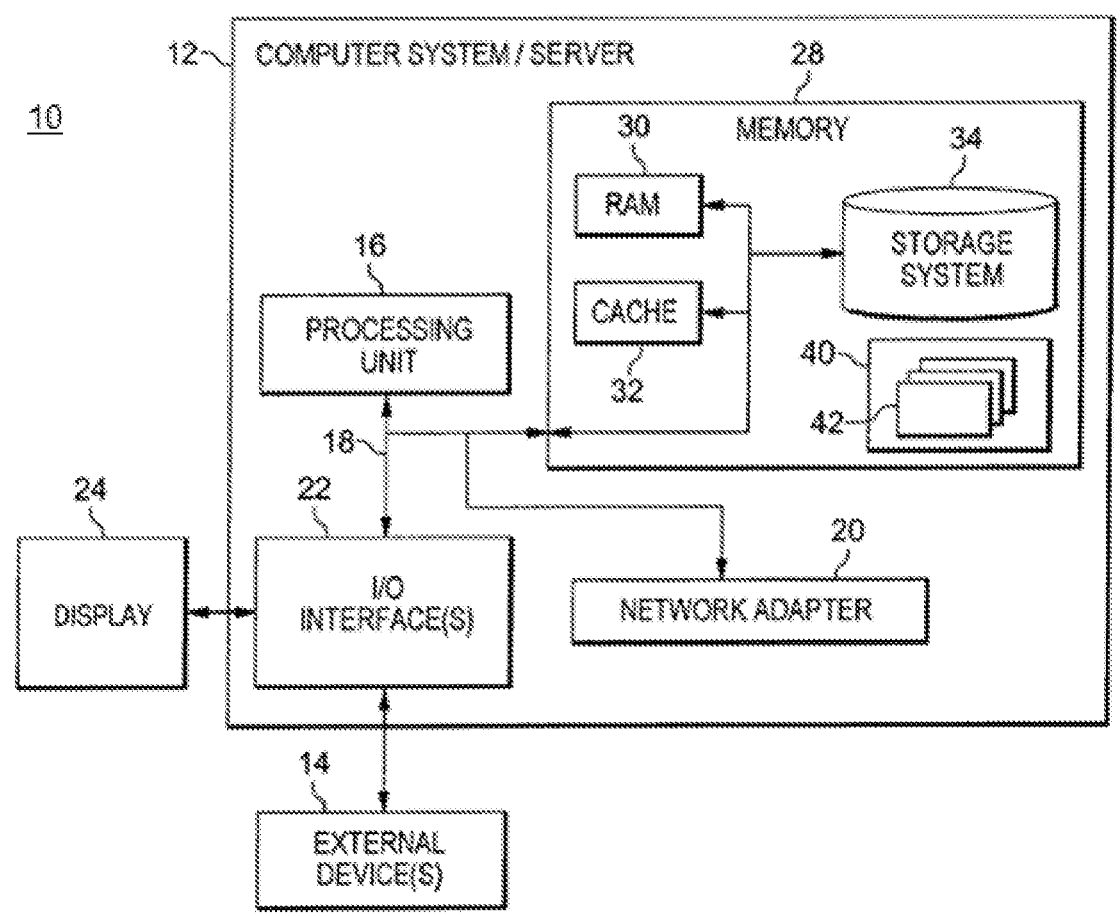
FIG. 1 depicts a cloud computing node, in accordance with one or more aspects set forth herein.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Throughout the application, the term one or more programs 440 (e.g., FIG. 4) is utilized to represent programs executed by various computing resources in a described computing environment. These programs are not necessarily executed by a common computing resource. The illustration in the figure is provided to illustrate aspects of embodiments of the present invention.

Embodiments of the present invention enable one or more programs 440 (see, e.g., FIG. 4) to run an instance of a guest image in one or more hypervisors, without the hypervisor (or in an environment with more than one hypervisor, without any hypervisor) knowing the contents of the guest image, at most as many times as the owner of the guest image determines. To this end, rather than communicate directly with the hypervisor that will run the guest image, in an embodiment of the present invention, the owner of the guest image communicates with a trusted component using the hypervisor as a mediator. The hypervisor is further prevented from accessing this information because when trusted component requests authorization for the instance from an authorizing authority, although the communication passes through the hypervisor to the authorizing authority, the request is encrypted using a request key that is known to the owner and the trusted component, Additionally, when the trusted components seek authorization from at authorizing entity at the client to initiate the instance, the communications between the trusted component and the authorizing entity are also encrypted with a key that is likewise not accessible to the hypervisor. In another embodiment of the present invention, the authorizing entity is located outside of the computing resources that houses the trusted component of a host and also in a separate computing resource from a client that requests that the host execute an instance of a given images.

In an embodiment of the present invention, one or more programs 440 (see, e.g., FIG. 4) comprising a trusted component in a host computing system, obtain, from a client, via a hypervisor of the host, a request to run an instance of a guest image within the hypervisor, where the request includes a unique identifier of the guest image, contents of the guest image, and a communication key, and where the request is encrypted with a request key accessible to the owner and the trusted component and not accessible to the hypervisor. The one or more programs 440 of the trusted component generate an authorization request to an authorizing entity of the client, requesting authorization for the hypervisor to run the instance, where the authorization request includes the unique identifier, a use counter, and a unique challenge. The one or more programs 440 generate the authorization request by decrypting the request with the request key to obtain the unique identifier, the contents of the guest image, and the communication key, determining, based on the unique identifier, a number of instances of the guest image running in the host computing system stored in the use counter. The one or more programs 440 encrypt the authorization request with the communication key. The one or more programs 440 communicate the authorization request to the authorizing entity, via the hypervisor.

In an embodiment of the present invention, the one or more programs 440, of the trusted component, obtain, from the authorizing entity, via the hypervisor, the authorization to run the instance. The one or more programs 440 analyze the authorization to determine if the authorization is authentic, and based on determining that the authorization is authentic, the one or more programs 440 utilize the contents of the guest image to initiate the instance. This analysis by the trusted component may include the one or more programs 440 decrypting the authorization with the communication key, determining if the authorization comprises a unique challenge response matching the unique challenge, and based on determining that the authorization comprises the unique challenge response, accepting, by the authorizing entity, the authorization as authentic.

In an embodiment of the present invention, the trusted component receives the authorization from the authorizing entity based on the authorizing entity determining that a global use counter, which includes all instances of the guest running in host systems including the host is less than an intended maximum number of running instances of the guest image. In an embodiment of the present invention, the one or more programs 440 may increment the use counter by one to simulate the number of instances running if the one or more programs 440 in the trusted component were to authorize this requested instance. If the counter is incremented in this fashion, the trusted component receives the authorization from the authorizing entity based on the authorizing entity determining that a global use counter, which includes all instances of the guest running in host systems including the host is less than or equal to an intended maximum number of running instances of the guest image. The use counter included in the authorization request and the authorization update the authorizing entity on the number of instances of the guest running in the specific host where the new instance, if authorized, would be executed.

In an embodiment of the present invention, the one or more programs 440 monitor instance and when the instance terminates and/or starts, the one or more programs 440 update the number of instances of the guest image running in the host computing system. Based on initiating the instance, the one or more programs 440 may update the number of instances of the guest image running in the host computing system. To this end, in an embodiment of the present invention one or more programs 440 terminate the instance and communicate a termination message encrypted with the communication key to the authorizing entity. This message may include the unique identifier, termination information, and a unique number. One or more programs 440 of the authorizing entity utilize the termination message to update the number of instances of the guest image running in the host computing system.

In an embodiment of the present invention, the one or more programs 440 obtain, at the trusted component, from the authorizing entity, via the hypervisor, the authorization. The one or more programs 440 analyze the authorization to determine if the authorization is authentic. Based on determining that the authorization is not authentic, the one or more programs 440 reject the authorization. To analyze the authorization, the one or more programs 440 may decrypt the authorization with the communication key and determine if the authorization includes a unique challenge response matching the unique challenge, Based on determining that the authorization does not comprise the unique challenge response, the one or more programs 440 reject the authorization as not authentic. In an embodiment of the present invention, the one or more programs 440 may then terminate a communication connection between the host and the client.

Embodiments of the present invention provide security advantages in shared public computing environments by controlling the creation of instances of programs in shared computing environments. Certain embodiments of the present invention provide enhanced security and privacy in public computing environments by controlling the number of instances of a guest in a given public environment. Aspects of the present invention that provide this control further isolate data utilized by guests running in a shared computing environment from vulnerabilities, such as rogue hypervisor activities, that could compromise the data integrity of the guests.

Although certain shared computing systems, such as various cloud computing environments, limit the exposure of guest data by limiting its accessibility to a hypervisor, vulnerabilities still exist as the guests (e.g., virtual machines/ servers) could potentially be cloned, analyzed, and compromised in malicious attacks. As aforementioned, shared computing environments enable execution of guests (e.g., virtual servers) while protecting virtual server content from a hypervisor such that a hypervisor can initiate a guest instance, but cannot access any guest data or context.

In a computing environment utilized by embodiments of the present invention, a trusted component, which may comprise firmware, forms a shim layer that marshals necessary access from the aforementioned hypervisor to a guest to provide the hypervisor with only the data and/or context necessary to run the guest. Thus, in this technical environment, guest pages owned by a guest are accessible only by the guest and not to the hypervisor. The hypervisor owns and can encrypt data that is not accessible to the guest and certain data, for example, I/O pages, are accessible to both the hypervisor and the guest as I/O buffers. Despite this data access isolation, the environment is susceptible to attacks where guests are cloned, isolated, and compromised.

Possible attacks in current shared computing environments include the threat of a rogue hypervisor administrator creating an unlimited number of instances of virtual servers, isolating them (hiding them from the actual client) and manipulating them in a way that compromises the integrity of the data. Shared environments may have certain controls in places to mitigate these attacks, for example, a certain shared computing environment provides security through encryption of hypervisor-accessible state and guest data. However, embodiments of the present invention increase security by limiting the instantiation of virtual servers, which helps guard against cloning and analysis of the virtual server by the attackers. When the number of instances of a guest is controlled, multiple guest instances cannot be created by a rogue hypervisor and utilized to compromise the integrity of the computing environment, Aspects of certain embodiments of the present invention improve present computing technology by improving privacy and data security in shared (e.g., public) computing environments. Improving privacy and data security in shared computing environments, including distributed environments such as cloud computing systems, is an issue that is unique to computer technology. By utilizing aspects of embodiments of the present invention, a given user can utilize resources within a shared computing environments without compromising the user's privacy. Thus, a given user can utilize a wealth of resources, including virtual resources that would not likely be available within a private computing system. Improving the security of private data in a public computing infrastructure constitutes an improvement to computer technology. Presently, in shared computing environments, the virtual servers initiated by individual users to meet their computing needs, can be cloned, isolated, and compromised, without the user realizing that a security breach has occurred. By introducing aspects that limit the instantiation of virtual servers, embodiments of the present invention can eliminate this particular security risk and maintain the privacy of user data in a public (shared) computing environment.

Advantages of certain embodiments of the present invention are realized in multi-user and multi-entity computing environments. As computing models become more complex and a given architecture is serviced by more providers, in a multi-faceted environment, the ability to effectively secure private data of a given user in the environment becomes more challenging. When the computer system responsible for instantiating a guest process in a shared environment is a node of a cloud computing environment, the breadth of resources available to one or more processors executing program code to process and instantiate the guest is greatly expanded. The improvements to guest security offered by embodiments of the present invention are realized in this type of environment as the scalable solution presented is improved by the ability of the one or more processors executing the program code to execute guest processes without compromising the integrity of the guest, providing privacy in a public computing environment.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, mobile devices, personal data assistants, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
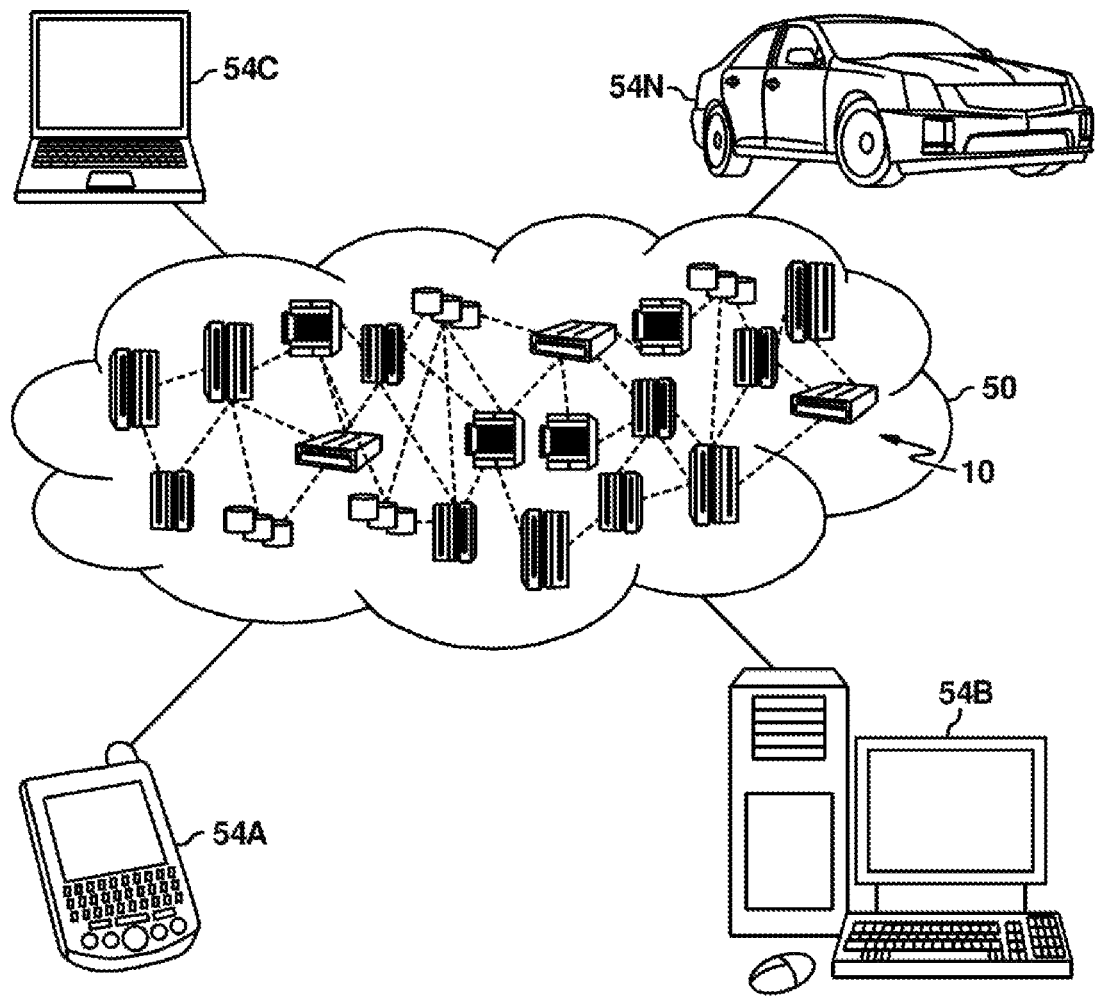
FIG. 2 depicts a cloud computing environment, in accordance with one or more aspects set forth herein.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
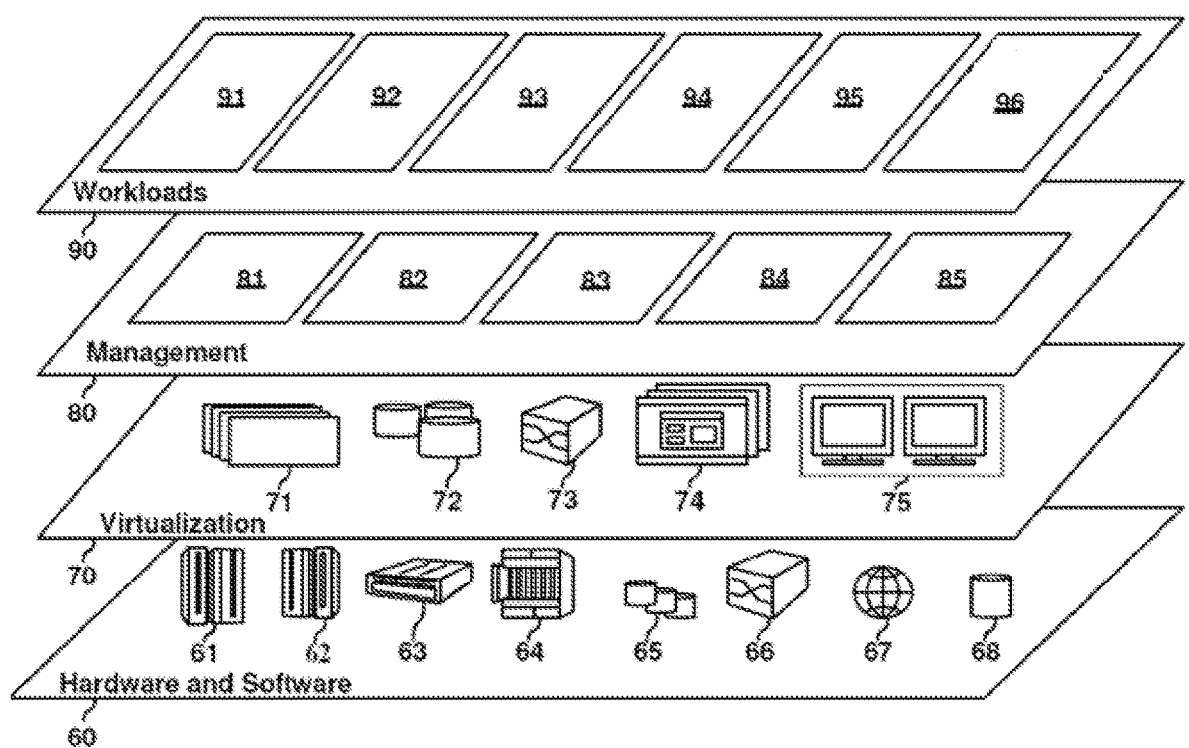
FIG. 3 depicts abstraction model layers, in accordance with one or more aspects set forth herein.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing authorization for launching guest instances 96, as described herein. Element 96 can be understood as one or more programs 440 described in FIG. 4.

Figure 4:
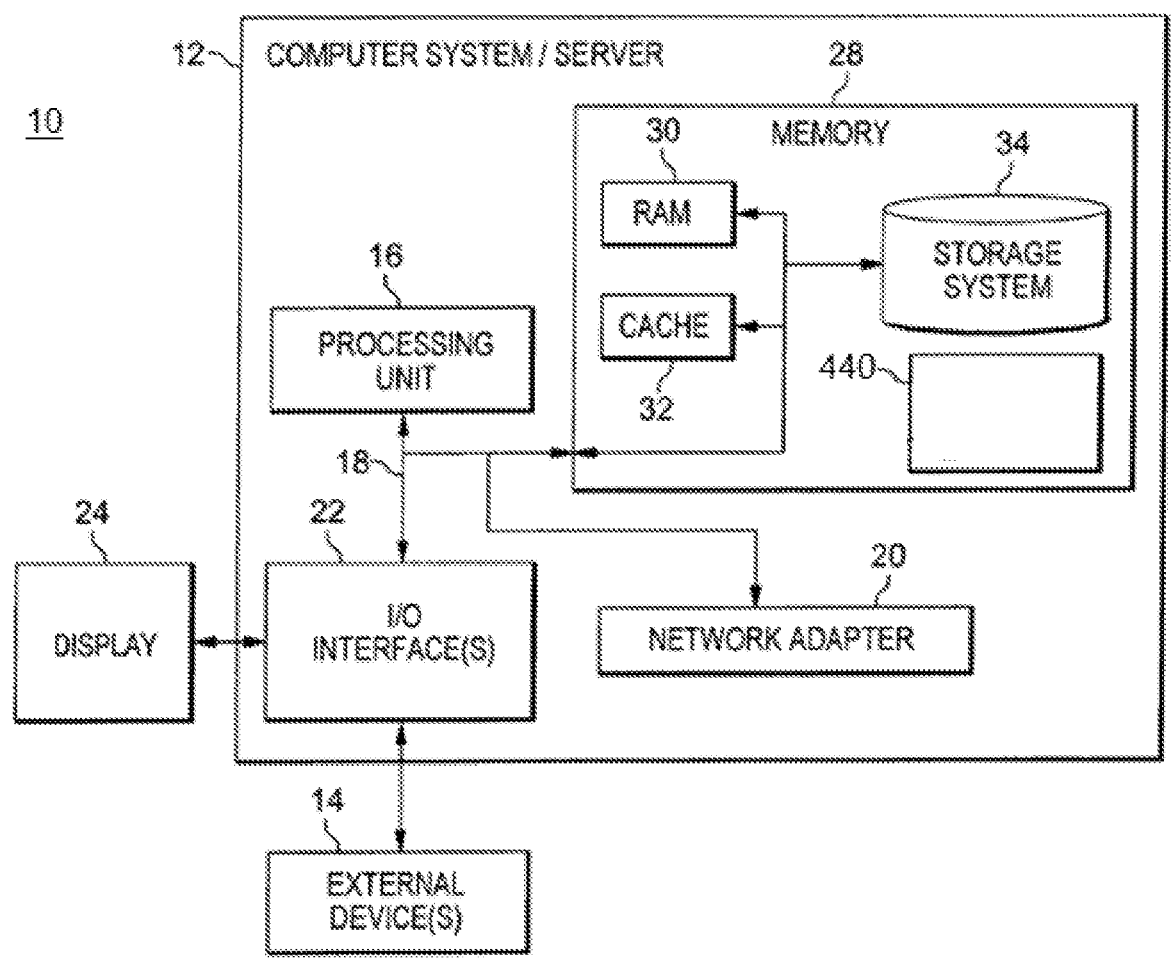
FIG. 4 depicts a hardware overview of a computing node, in accordance with one or more aspects of the present invention.

FIG. 4 depicts a hardware overview of a computing node 10, in accordance with one or more aspects set forth herein.

Program/utility 40 as set forth in FIG. 1 can include one or more programs 440 as set forth in FIG. 4, and program/utility 40, including, for example one or more programs 440 to determine whether an instance of a guest is authorized to start in a given public computing environment, as described in work layer 96. Program/utility 40 as set forth in FIG. 1 can optionally include additional programs.

One or more programs 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more programs 440 generally carry out the functions and/or methodologies of embodiments of the invention as described herein.

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
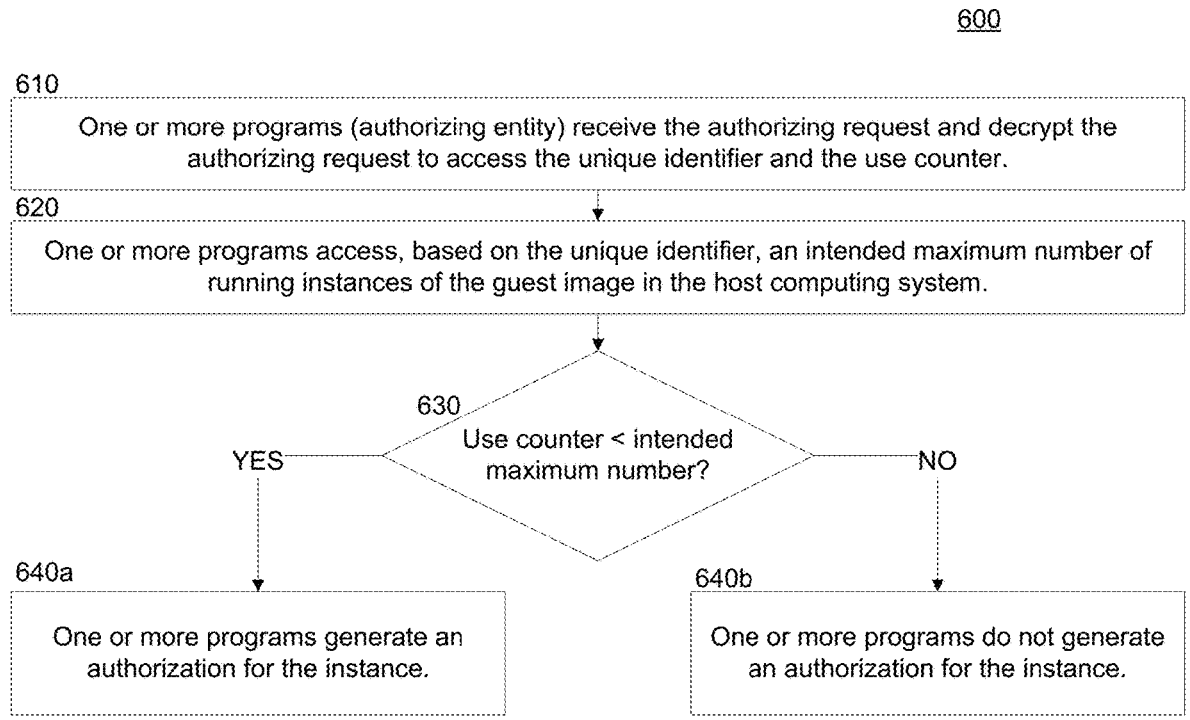
FIG. 6 depicts a workflow that illustrates aspects of an embodiment of the present invention.

FIGS. 5-6 depict both workflows 500 600 that illustrate certain aspects of an embodiment of the present invention. However, as discussed below, while FIG. 5 depicts aspects of certain embodiments from the vantage point of a trusted component, FIG. 6 depicts aspects of certain embodiments from the vantage point of an authorizing authority.

Referring to FIG. 5, in an embodiment of the present invention, a one or more programs 440 (e.g., FIG. 4) that are executing as a trusted component in a host computing system, obtain from a client, via a hypervisor of the host, a request to run an instance of a guest image within the hypervisor (510). In an embodiment of the present invention, the request includes a unique identifier of the guest image, contents of the guest image, and a communication key (e.g., comm_key). The request is encrypted with a request key that is accessible to the owner and the trusted component and is not accessible to the hypervisor. In an embodiment of the present invention, by using a key that is not known to the hypervisor, which the one or more programs 440 use as a mediator, when the client (i.e., the owner of the guest image) communicates with the trusted component using the hypervisor as a mediator, the hypervisor does not learn the contents of the image, the key to be used by the trusted component and the authorizing entity, or the unique identifier (e.g., image-uuid) associated with the image. The unique identifier may be a random number. In an embodiment of the present invention, the request key may be negotiated between owner and trusted component using well known asymmetric cryptography methods, if the trusted component has a private key. By encrypting the request in this manner, the one or more programs 440 executing as a trusted component can appreciate the authenticity of the request because the trusted component can determine that the communication key and the unique identifier belong to the guest image, and that all these components belong to the original request and have not been replaced by some party in the middle. In an embodiment of the present invention, the components of the request are stored in an encrypted datum.

Returning to FIG. 5, responsive to obtaining the request, the one or more programs 440 of the trusted component generate an authorization request to an authorizing entity of the client requesting authorization for the hypervisor to run the instance (520). In an embodiment of the present invention, the authorization request includes the unique identifier, a use counter, and a unique challenge. When the one or more programs 440 generate the request, the one or more programs 440 decrypt the request with the request key to obtain the unique identifier, the contents of the guest image, and the communication key, determining, based on the unique identifier, a number of instances of the guest image running in the host computing system and incrementing the number by one to generate the use counter, and generate the unique challenge.

To again ensure that the hypervisor, which the trusted component will use as a mediator to the authorizing authority, cannot manipulate the contents of the authorization request, the one or more programs 440 of the trusted component encrypt the authorization request with the communication key (530) before communicating the authorization request to the authorizing entity, via the hypervisor (540).

In an embodiment of the present invention, the one or more programs 440 may or may not obtain an authorization from an authorizing entity (via the hypervisor) to initiate the instance of the guest image. Whether one or more programs 440 of the authorizing entity responds to the authorization request with an authorization is dependent on certain factors, which may vary dependent upon the embodiment of the present invention. FIG. 6 is a workflow 600 that illustrates the certain aspects of the present invention as performed by one or more programs 440 (e.g., FIG. 4) of the authorizing authority, which may be located on a separate computing node from the trusted component, including at the client.

As discussed above, by limiting the amount of instances of a given guest in a shared computing environment, potential hazards, such as a rogue hypervisor cloning instances for malicious purposes can be mitigated. To prevent the cloning, the authorizing authority assists in controlling the number of instances of a given guest image that it authorizes to run in a hypervisor. As aforementioned, the authorization request includes the unique identifier of the guest image and a use counter, which indicates how many instances of the guest image are running in the hypervisor.

Referring to FIG. 6, the one or more programs 440 of the authorizing entity, receive the authorizing request and decrypt the authorizing request with the aforementioned communication key (e.g., comm_key), to access the unique identifier and the use counter (610). The one or more programs 440 of the authorizing entity access, based on the unique identifier, an intended maximum number of running instances of the guest image in all host computing systems (620). As understood by one of skill in the art, in an embodiment of the present invention, an authorizing entity is located outside of a trusted component in order to enable the one or more programs 440 to restrict the number of running images on all hosts. To that end, in an embodiment of the present invention, all trusted components of all hosts ask the same authorizing entity for permission to start an image and the authorizing entity executes one or more programs 440 that compare the sum of all use counts from all hosts with this intended maximum number.

This value, the intended maximum number of running instances, can be stored in a computer resource accessible to the authorizing authority or can be included in the initial request and the authorizing request, for example, tied to the unique identifier itself, and/or is statically or dynamically maintained external to the request. The one or more programs 440 of the authorizing entity compare the use counter of a request form a host and the most recent use counters received before from other hosts to intended maximum number of running instances of the guest image (630). The one or more programs 440 of the authorization entity generate an authorization for the instance provided that the sum of the most recently received use counters from all hosts is less than the intended maximum number of running instances of the guest image (640a). If the use counter is greater than or equal to the intended maximum number of running instances, the one or more programs 440 of the authorization entity do not respond to the authorizing request (640a). In an embodiment of the present invention, as part of generating the authorization, the one or more programs 440 of the authorization entity generate a challenge response and encrypt, with the communication key, the authorization and the challenge response and communicate these values to the trusted component, via the hypervisor (640a).

Returning, to FIG. 5, the one or more programs 440 of the trusted component (e.g., FIG. 4) may obtain, from the authorizing entity, via the hypervisor, the authorization (550). As another security precaution, the one or more programs 440 of the trusted component analyze the authorization to determine if the authorization is authentic (560). Based on determining that the authorization is authentic, one or more programs 440 of the trusted component, initiate the instance, utilizing the contents of the guest image (570a). Based on determining that the authorization is inauthentic, the one or more programs 440 of the trusted component, do not initiate the instance (570b).

In an embodiment of the present invention, the one or more programs 440 of the trusted component verify the authenticity of the authorization by decrypting it, i.e., with the communication key and determining if the authorization comprises a unique challenge response matching the unique challenge. If the one or more programs 440 determine that the authorization includes the unique challenge response that matches the unique challenge, the one or more programs 440 accept the authorization as authentic. However, if the authorization does not include the unique challenge response or contains a challenge response that does not match the unique challenge, the one or more programs 440 conclude that the authorization is not authentic and do not initiate the instance. In this event, the one or more programs 400 may terminate a communication connection between the trusted component and the authorization entity. As understood by one of skill in the art, embodiments of the present invention utilize the aforementioned challenge and challenge response in order to ensure the authenticity of authorizing entity. Any mismatch insidates that the authorizing entity cannot be trusted and therefore, the trusted component will not initiate the requested instance. Additionally, if an authorizing entity is trusted but declines to provide the trusted component with authorization for the hypervisor to run a new image, the origin of the request may not be suspect.

In an embodiment of the present invention, one or more programs 440 associated with the authorizing entity determine whether a given guest instance or image can be initiated, for example, by a trusted component in a computing environment. In an embodiment of the present invention, on initial program load (IPL) of such the image, the trusted component checks how many instances of that image (e.g., utilizing image-uuid) are already running, and potentially refuses to IPL. However, in certain embodiments of the present invention, a one or more programs 440 of the trusted component may make certain adjustments to accommodate execution of a guest in a computing environment even if initially the guest is not authorized based on the number of instances exceeding a maximum. For example, one or more programs 440 may migrate a guest to another trusted component, such as another trusted component, locally decreasing the limit for the given guest, but increasing the numbers at a target trusted location and therefore maintaining the number of instances overall. However, running guests unsynchronized in this manner can carry some risk (loosing track of usage counters on various trusted components, resulting in lower or higher number of instances than intended). However, utilizing unique identifiers for guests can mitigate this issue even in the distributed architecture.

In an embodiment of the present invention, the authorizing entity, which provides for remote authorization of a guest instance, can be implemented in a shared computing environment in a variety of different ways, only some of which will be described here for illustrative purposes. For example, the authorizing entity 730 can be a service provided by a client, for example, on the premises of the client. Alternatively, the authorizing entity may execute as a virtual server in a shared computing environment, such as a cloud computing environment. As a virtual server, the authorizing entity could be defined by the client and could carry a key for use in communications with the trusted component (e.g., the comm_key).

Embodiments of the present invention are scalable and can be utilized in complex computing environments where controls are not centralized. For example, embodiments of the present invention may utilize one or more trusted components, for example, to authorize guest instances in a computing environment that includes a cluster of computing nodes. In this environment, embodiments of the present invention may utilize a global view consisting of several hosts, for example, several trusted components in a shared computing environment provide the authorizing entity with an overview of all Cluster nodes, (e.g., a global counter).

As explained in the context of FIGS. 5-7, a trusted component and an authorizing component communicate and the result of that communication is a decision regarding authorizing a guest. Specifically, in an embodiment of the present invention, a trusted component, requests authorization from the authorizing entity to start a guest instance, such as a virtual server, with a given unique identifier (e.g., image-uuid). The communication may comprise a challenge to prevent replay attacks. The trusted component may use a key (e.g., comm_key) to encrypt entire communication, which comprises the request details. The communications connection between the trusted component and the authorizing component may be direct or indirect, for example, a hypervisor may act as a proxy for the protocol talk that comprises this communication.

FIG. 7 is a combination workflow and computing environment diagram illustrating aspects of certain embodiments of the present invention when elements of a method are distributed between a client, a hypervisor, a trusted component, and an authorizing entity. This division of aspects of an embodiment of the present invention is offered for ease of understanding. However, one of skill in the art will recognize that certain aspects of the present invention may be distributed differently between these entities, different entities, and/or accomplished by the functionality of a single computing entity. Specifically, FIG. 7 illustrates a client initiating a guest, such as a first virtual server, in an embodiment of the present invention. In one example, a computing environment 700 is based on the z/Architecture, offered by International Business Machines (IBM®) Corporation, Armonk, N.Y. The z/Architecture is described in an IBM Publication entitled "z/Architecture—Principles of Operation," Publication No. SA22-7932-09, 10$^{th}$ Edition, September 2012, which is hereby incorporated by reference herein in its entirety. Z/ARCHITECTURE, IBM, and Z/OS and Z/VM are registered trademarks of International Business Machines Corporation, Armonk, N.Y. Other names used herein may be registered trademarks, trademarks or product names of International Business Machines Corporation or other companies.

As seen in FIG. 7, a client 70 deploys a guest image and instructs a hypervisor 72 to initial-program load (IPL) the guest image (710). The hypervisor 72 sets up guest context and requests that a trusted component 74 start the guest, also referred to as an image (720). In this example, the guest may include virtual CPUs. The trusted component 74 detects that the image needs remote authorization before further execution and generates a request to the authorizing entity 76 (730). In an embodiment of the present invention, the trusted component 74 may generate the identifier by using the image-uuid. In an embodiment of the present invention, as part of generating the request, the trusted component 74 encrypts the request, including the unique identifier, use counter, and unique challenge. The trusted component 74 may utilize a key, for example, comm_key, to encrypt the request. The trusted component 74 may have obtained the comm_key from the initial request from the client 70.

After receiving the generated request from the trusted component 74, the hypervisor 72 forwards the request to an authorizing entity 76 (740). The authorizing entity, compares the use counter associated with the unique identifier (e.g., image-uuid) against an intended maximum number of running instances for image-uuid and based on this comparison, responds to the challenge authorizing the start of the guest (750). In an embodiment of the present invention, the authorizing entity 76 encrypts the response using the key (e.g., comm_key) and sends this response to the hypervisor 72. The hypervisor 72 forwards the response to the trusted component 74 (755).

Provided that the authorizing entity has authorized the guest, the trusted component starts virtual CPUs of the guest (760). In an embodiment of the present invention, the guest can self-terminate if connectivity to authorizing entity is lost, to prevent isolation of the guest by the hypervisor administration at any time. However, embodiments of the present invention do not require a guest to have a connection to an authorizing entity.

After authorizing a first guest for a given client in a shared computing environment, such as in a cloud computing environment. In one such implementation of aspects of embodiments of the present invention, one or more authorizing entities can execute in the environment (e.g., a shared and/or cloud computing environment). Rather than bind the ability to implement a guest (e.g., boot a virtual server) at connectivity from the environment to the client. Based on the aforementioned authorization process, one or more programs 440 executing as an authorizing entity are aware of the maximum number of guests which are allowed to run simultaneously in the computing environment. In an more complex environments, several authorizing entities can ensure availability of an authorizing entity to each client attempting to start a guest instance in the computing environment. The authorizing entities may communicate with each other or may all have access to global counters in order to track authorizations of guests within the environment. In this manner, the authorizing entities may follow quorum mechanisms to handle split brain situations and have the quorum re-assess global use counters. In order to prevent execution of guests within the shared environment within authorization of authorizing entities, guests that fail to communicate with authorizing entities self-terminate as a security measure.

Figure 8:
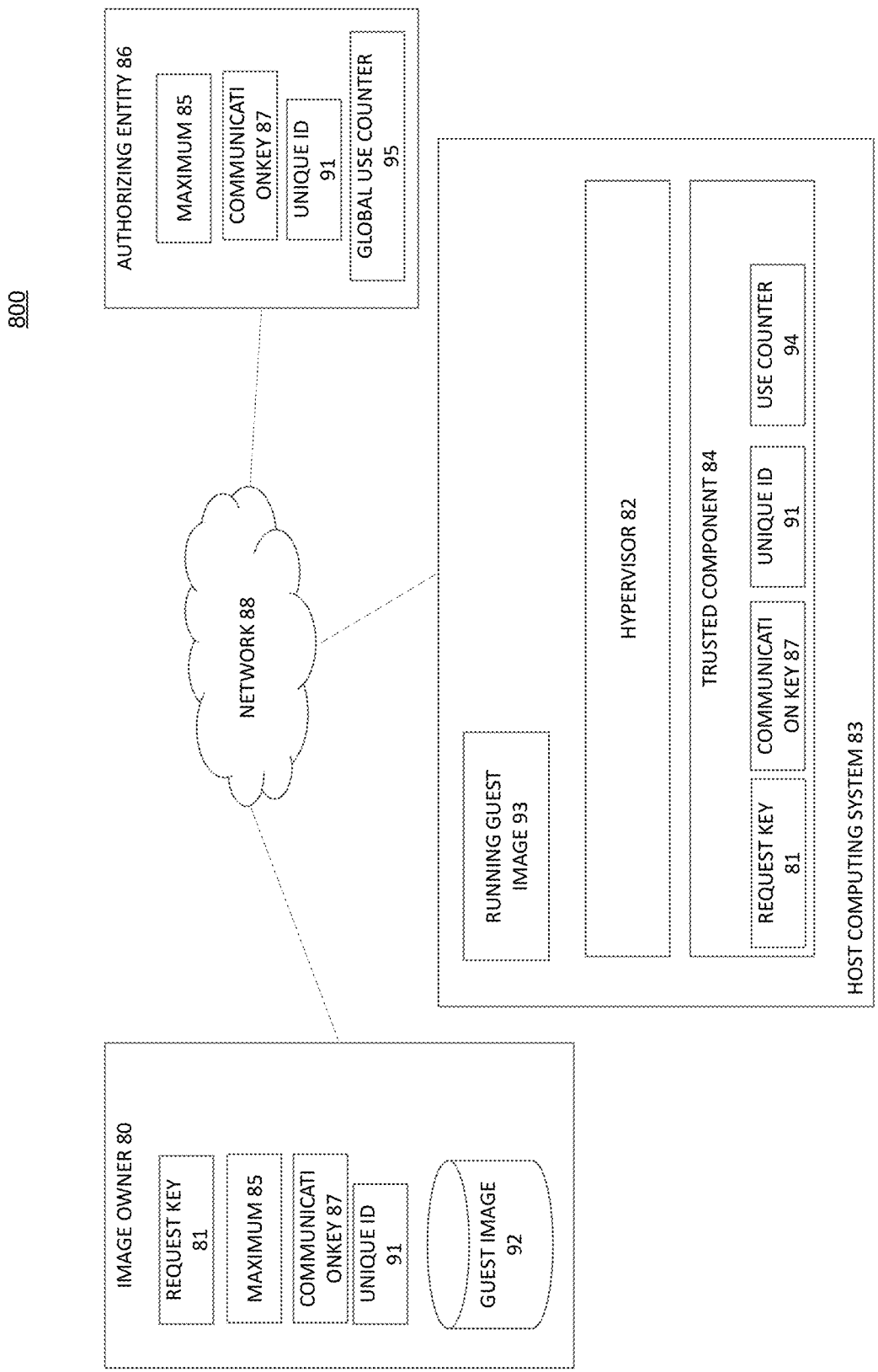
FIG. 8 illustrates portions of a technical environments into which aspects of an embodiment of the present invention are implemented.

FIG. 8 is a diagram illustrating certain aspects of an embodiment of the present invention. As seen in FIG. 8, an image owner 80, for example, a client system, can request that an instance of an image run in a hypervisor 82 by making a request to a trusted component 84 at a host computing system 83, via the hypervisor 82. As aforementioned, and as illustrated in FIG. 8, the request includes a unique identifier of the guest image 91, contents of the guest image 92, and a communication key 87, and the request is encrypted with a request key 81 accessible to the image owner 80 and the trusted component 84 and not accessible to the hypervisor 82. As illustrated in FIG. 8, the image owner 80 can make this request because it can access the request key 81, the communication key 87, and the unique identifier 91. The image owner 80, in this embodiment of the present invention, can also access a maximum number 85 which is the maximum number of instances of the image that may be authorized to run at one time. In an embodiment of the present invention, one or more programs 440 in the image owner may include the maximum number 85 in the request.

Returning to FIG. 8, the hypervisor 82 relays the request from the image owner 80 to the host computing system 83, specifically to the trusted component 84. The hypervisor 82, which does not have access to the request key 81, which the trusted component 84 may utilize to decrypt the request. As illustrated in FIG. 8, the trusted component 84, based on its access to the request key 81, may access the communication key 87 and the unique identifier 91. The trusted component 84 may also access/determine the use counter 94 as one or more program 440 may obtain (and maintain) how many instances of the image identified by the unique identifier are executing in the host computing system 83.

As discussed in reference to earlier embodiments, the trusted component 84 requests authorization from the authorizing entity 86 before the hypervisor 82 can execute the requested instance. FIG. 8 illustrates an authorized instance of a guest image 93 running in the hypervisor 82. The trusted component 84 may encrypt the authorization request with the communication key 87 because, as seen in FIG. 8, in an embodiment of the present invention, the authorizing entity 86 has access to the communication key 87 to decrypt the authorization request. In an embodiment of the present invention, in order to authorize the request, the authorizing entity 86, which is outside of the host computing system 83 (e.g., connected to the image owner 80 and the host computing system 83 via a network 88, including but not limited to, the Internet), accepts the use counter 94, as part of the request, utilizes it to update the global use counter 95, and compares the global user counter 95 to the maximum number 85, to determine whether the authorize the requested instance of the image. In an embodiment of the present invention, an allowed threshold for an image identified by a given unique identifier 91 in a host computing system 83 is the difference of the maximum number 85 and the number of running instance of the image on all other host computing systems, i.e., the value of the global use counter 95 (i.e., after being updated with the use counter, as discussed earlier).

Thus, as illustrated in FIG. 8, in an embodiment of the present invention, the authorizing entity 86 knows, for each guest image, the unique identifier 91, the communication key 87, and a maximum number (count) 85 of all image instances that may run on all host systems with trusted components, such as host computing system 83. The authorizing entity 86 may also maintain, for each guest image, a global use counter 95 of currently running instance of the guest image on all hosts.

As illustrated in FIG. 8, in an embodiment of the present invention, an authorizing entity 86 is outside at least one host computing system 83 and therefore, the authorizing entity 86 maintains how many instances of an image are running on host computing system 83 and any additional host, in a global use counter 95. Thus, in the embodiment of FIG. 8, if the value of global use counter 95 is smaller than the maximum number 85, the authorizing entity 86 may grant the request of the trusted component 84 to start a new image.

One or more programs 440 (e.g., FIG. 4) executing as the trusted component 84 communicate to the authorizing entity 86 whenever a guest image instance is terminated to keep the value of the global use counter, which is maintained by the authorizing entity 86 (as seen in FIG. 8) accurate. However, in the event that a host computing system 83 crashes, the authorizing entity 86 will not be notified of the termination of the instances executing in the host computing system 83. As a failsafe in this event, in an embodiment of the present invention, the trusted component 84 also keeps a local use count 94, and may communicate this use count 94 to the authorizing entity 86 in each authorization request, such that for each request, the authorizing entity 86 may replace its recording of the use count of the trusted component 84 using the newly transmitted use count of the trusted component 84, which one or more programs 440 executing as the authorizing entity 86 utilize to compute the value of the global use counter 95. Thus, in an embodiment of the present invention, if the value of the global use counter 95 is less than the maximum number 85, one or more programs 440 of the authorizing entity 86 may grant the request and one or more programs 440 increment the use counter 94 of the trusted component 84 and the authorizing entity 86. Thus, one or more programs 440 of the authorizing entity 86 maintain an accurate global use counter 95 that is larger than or equal to the number of all guest image instances on all hosts whether or not host failures occur.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method for managing a guest instance in a share environment comprising:
   obtaining, by a trusted component of a host computing system, wherein the host comprises one or more hardware processors, from a client, via a hypervisor of the host computing system, an initiation request to run an instance of a guest image within the hypervisor, wherein the initiation request comprises a unique identifier of the guest image, contents of the guest image, and a communication key, and wherein the initiation request is encrypted with a request key accessible to the owner and the trusted component and not accessible to the hypervisor;
   generating, by the trusted component, an authorization request to an authorizing entity of the client requesting authorization for the hypervisor to run the instance, wherein the authorization request comprises a unique challenge generated by the trusted component, the unique identifier, and a use counter;
   determined by the trusted component, based on the unique identifier decrypted with the request key a number of instances of the quest image running in the host computing system stored in the use counter;
   encrypting, by the trusted component, the authorization request with the communication key; and
   communicating, by the trusted component, the authorization request to the authorizing entity, via the hypervisor; and
   upon receiving the authentic authorization response, initiating the instance of the guest image within the hypervisor.

2. The computer-implemented method of claim 1, wherein the generating comprises:
   decrypting, by the trusted component, the request with the request key to obtain the unique identifier, the contents of the guest image, and the communication key.

3. The computer-implemented method of claim 2, wherein the generating comprises:
   determining, by the trusted component, based on the unique identifier, a number of instances of the guest image running in the host computing stored in the use counter.

4. The computer-implemented method of claim 1, wherein the generating comprises:
   generating, by the trusted component, the unique challenge.

5. The computer-implemented method of claim 4, further comprising:
   monitoring, by the trusted component, based on the unique identifier, the instances of the guest image running on a host computing system; and
   updating, based on a start of the instance or a termination of the instance, the number of instances of the guest image running in the host computing system.

6. The computer-implemented method of claim 4, further comprising:
   terminating, by the trusted component, the instance; and
   communicating, by the trusted component, to the authorizing entity, a termination message encrypted with the communication key comprising the unique identifier, termination information, and a unique number, wherein the authorizing entity utilizes the termination message to update the number of guest number of instances of the guest image running in the host computing system if the authorizing entity has not received the unique number in a previous termination request.

7. The computer-implemented method of claim 1, further comprising:
   obtaining, by the trusted component, from the authorizing entity, via the hypervisor, the authorization;
   analyzing, by the trusted component, the authorization to determine if the authorization is authentic; and
   based on determining that the authorization is authentic, initiating the instance, by the trusted component, by utilizing the contents of the guest image.

8. The computer-implemented method of claim 7, wherein the analyzing comprises:
   decrypting, by the trusted component, the authorization with the communication key;
   determining, by the trusted component, if the authorization comprises a unique challenge response matching the unique challenge; and
   based on determining that the authorization comprises the unique challenge response, accepting, by the authorizing entity, the authorization as authentic.

9. The computer-implemented method of claim 7, wherein the authorization is based on the authorizing entity determining that a global use counter comprising the use counter and a count of instances with the unique identifier on all host systems other than the host, is less than a maximum number of running instances of the guest image, wherein the authorizing entity obtained the maximum number from the client via a secure communication channel.

10. The computer-implemented method of claim 9, further comprising:
    updating, by the authorizing entity, the global use counter, based on the communicating of the use counter in the authorization request from the trusted component and the authorization.

11. The computer-implemented method of claim 1, further comprising:
    obtaining, by the trusted component, from the authorizing entity, via the hypervisor, the authorization;
    analyzing, by the trusted component, the authorization to determine if the authorization is authentic; and
    based on determining that the authorization is not authentic, rejecting the authorization.

12. The computer-implemented method of claim 11, wherein the analyzing comprises:
    decrypting, by the trusted component, the authorization with the communication key;
    determining, by the trusted component, if the authorization comprises a unique challenge response matching the unique challenge; and based on determining that the authorization does not comprise the unique challenge response, rejecting the authorization as not authentic.

13. The computer-implemented method of claim 11, further comprising:
terminating, by the one or more processors, a communication connection between the host and the client.

14. The computer-implemented method of claim 1, further comprising:
communicating, by the client, to the authorizing entity, the unique identifier, the communication key, and a maximum number of running instances of the guest image, through a secure channel.

15. A computer program product embedded in a non-transitory computer readable storage medium readable by one or more hardware processors and storing instructions for execution by the one or more hardware processors for performing a method for managing a quest instance in a share environment comprising:
obtaining, by a trusted component of a host computing system, wherein the host comprises one or more hardware processors, from a client, via a hypervisor of the host computing system, an initiation request to run an instance of a guest image within the hypervisor, wherein the initiation request comprises a unique identifier of the guest image, contents of the guest image, and a communication key, and wherein the initiation request is encrypted with a request key accessible to the owner and the trusted component and not accessible to the hypervisor;
generating, by the trusted component, an authorization request to an authorizing entity of the client requesting authorization for the hypervisor to run the instance, wherein the authorization request comprises a unique challenge generated by the trusted component, the unique identifier, and a use counter;
determining, by the trusted component, based on the unique identifier decrypted with the request key a number of instances of the quest image running in the host computing system stored in the use counter;
encrypting, by the trusted component, the authorization request with the communication key; and
communicating, by the trusted component, the authorization request to the authorizing entity, via the hypervisor; and
upon receiving the authentic authorization response, initiating the instance of the guest image within the hypervisor.

16. The computer program product of claim 15, wherein the generating comprises:
decrypting, by the trusted component, the request with the request key to obtain the unique identifier, the contents of the guest image, and the communication key.

17. The computer program product of claim 16, wherein the generating comprises:

determining, by the trusted component, based on the unique identifier, a number of instances of the guest image running in the host computing stored in the use counter.

18. The computer program product of claim 15, wherein the generating comprises:
generating, by the trusted component, the unique challenge.

19. The computer program product of claim 15, the method further comprising:
obtaining, by the trusted component, from the authorizing entity, via the hypervisor, the authorization;
analyzing, by the trusted component, the authorization to determine if the authorization is authentic; and
based on determining that the authorization is authentic, initiating, by the trusted component, utilizing the contents of the guest image, the instance.

20. A system comprising:
a memory;
one or more hardware processors in communication with the memory; and
program instructions executable by the one or more hardware processors via the memory to perform a method for managing a quest instance in a share environment, the method comprising:
obtaining, by a trusted component of a host computing system, wherein the host comprises one or more hardware processors, from a client, via a hypervisor of the host computing system, an initiation request to run an instance of a guest image within the hypervisor, wherein the initiation request comprises a unique identifier of the guest image, contents of the guest image, and a communication key, and wherein the initiation request is encrypted with a request key accessible to the owner and the trusted component and not accessible to the hypervisor;
generating, by the trusted component, an authorization request to an authorizing entity of the client requesting authorization for the hypervisor to run the instance, wherein the authorization request comprises a unique challenge generated by the trusted component, the unique identifier, and a use counter;
determining, by the trusted component, based on the unique identifier decrypted with the request key a number of instances of the quest image running in the host computing system stored in the counter;
encrypting, by the trusted component, the authorization request with the communication key; and
communicating, by the trusted component, the authorization request to the authorizing entity, via the hypervisor; and
upon receiving the authentic authorization response, initiating the instance of the guest image within the hypervisor.

* * * * *